United States Patent
Delaney

(10) Patent No.: US 7,590,276 B2
(45) Date of Patent: Sep. 15, 2009

(54) SYSTEM AND METHOD FOR PROGRAMMING INTERRUPTING OPERATIONS DURING MOVING IMAGE ACQUISITION SEQUENCES IN A VISION SYSTEM

(75) Inventor: Mark L. Delaney, Shoreline, WA (US)

(73) Assignee: Mitutoyo Corporation, Kawasaki-shi (JP)

( * ) Notice: Subject to any disclaimer, the term of this patent is extended or adjusted under 35 U.S.C. 154(b) by 793 days.

(21) Appl. No.: 11/018,155

(22) Filed: Dec. 20, 2004

(65) Prior Publication Data
US 2006/0133663 A1 Jun. 22, 2006

(51) Int. Cl.
*G06K 9/00* (2006.01)
*H04N 9/47* (2006.01)
*G06F 19/00* (2006.01)

(52) U.S. Cl. ............... 382/141; 382/148; 382/151; 382/152; 382/153; 348/86; 348/92; 348/95; 348/142; 700/173; 700/181

(58) Field of Classification Search ............ 382/141, 382/148, 151, 152, 153; 348/86, 92, 95, 348/142; 700/173, 181
See application file for complete search history.

(56) References Cited

U.S. PATENT DOCUMENTS

| | | | | |
|---|---|---|---|---|
| 4,305,130 A * | 12/1981 | Kelley et al. | ............... | 700/259 |
| 6,937,753 B1 * | 8/2005 | O'Dell et al. | ............... | 382/141 |
| 6,987,867 B1 * | 1/2006 | Meier et al. | ............... | 382/111 |
| 7,030,351 B2 * | 4/2006 | Wasserman et al. | ...... | 250/201.3 |
| 2002/0071603 A1 * | 6/2002 | Ungpiyakul et al. | ........ | 382/152 |
| 2004/0097160 A1 * | 5/2004 | Kaltenbach et al. | ............ | 445/3 |

* cited by examiner

*Primary Examiner*—Matthew C Bella
*Assistant Examiner*—Michael A Newman
(74) *Attorney, Agent, or Firm*—Christensen O'Connor Johnson Kindness PLLC

(57) ABSTRACT

Methods and systems of part programming for machine vision inspection systems are provided, which permit a user to readily define multiple image acquisition operations interspersed with associated image analysis and/or inspection operations during learn mode operations and in the resulting part program image acquisition operations for at least some of the images are arranged into a continuous motion image acquisition sequence that acquires images and stores images in a "non-interspersed" manner in order to increase the throughput of the machine vision inspection system. Image analysis/inspection operations associated with the stored images are performed subsequently by recalling the store images. The programming systems and methods disclosed herein may operate automatically to facilitate rapid programming for a variety of workpieces by relatively unskilled users, wherein the resulting programs include continuous motion image acquisition sequences.

7 Claims, 10 Drawing Sheets

SYSTEM AND METHOD FOR PROGRAMMING INTERRUPTING OPERATIONS DURING MOVING IMAGE ACQUISITION SEQUENCES IN A VISION SYSTEM

FIELD OF THE INVENTION

The invention relates generally to methods for operating a machine vision inspection system with a camera and stage that are movable relative to one another in multiple directions so as to scan and inspect selected features of a workpiece on the stage, and more particularly to systems and methods that permit a user to readily program system operations that are not compatible with moving (continuous) image acquisition, while also programming moving image acquisition sequences.

BACKGROUND OF THE INVENTION

Precision machine vision inspection systems (or "vision systems" in short) can be utilized to obtain precise dimensional measurements of inspected objects and to inspect various other object characteristics. Such systems may include a computer, a camera and optical system, and a precision stage that is movable in multiple directions so as to allow the camera to scan the features of a workpiece that is being inspected. One exemplary prior art system that is commercially available is the QUICK VISION® series of PC-based vision systems and QVPAK® software available from Mitutoyo America Corporation (MAC), located in Aurora, Ill. The features and operation of the QUICK VISION® series of vision systems and the QVPAK® software are generally described, for example, in the QVPAK 3D CNC Vision Measuring Machine Users Guide, published January 2003, and the QVPAK 3D CNC Vision Measuring Machine Operation Guide, published September 1996, each of which is hereby incorporated herein by reference in their entirety. This product, as exemplified by the QV-302 Pro model, for example, is able to use a microscope-type optical system to provide images of a workpiece at various magnifications, and move the stage as necessary to traverse the workpiece surface beyond the limits of any single video image. A single video image typically encompasses only a portion of the workpiece being observed or inspected, given the desired magnification, measurement resolution, and physical size limitations of such systems.

Machine vision inspection systems generally utilize automated video inspection. U.S. Pat. No. 6,542,180 teaches some examples of automated video inspection. As taught in the '180 patent, automated video inspection metrology instruments generally have a programming capability that allows an automatic inspection event sequence to be defined by the user for each particular workpiece configuration. This can be implemented either in a deliberate manner, such as text-based programming, for example, or through a recording mode which progressively "learns" the inspection event sequence by storing a sequence of machine control instructions corresponding to a sequence of inspection operations performed by a user, or through a combination of both methods. Such a recording mode is often referred to as "learn mode" or "training mode". Once the inspection event sequence is defined in "learn mode," such sequence can then be used to automatically acquire (and additionally analyze or inspect) images of a workpiece during "run mode."

The machine control instructions, including the specific inspection event sequence including image acquisition parameters, etc., are generally stored as a "part program" or "workpiece program" that is specific to the particular workpiece configuration. The ability to create part programs with instructions that perform a predetermined sequence of inspection operations provides several benefits, including enhanced inspection repeatability, as well as the ability to automatically execute the same part program repeatedly on one or more compatible machine vision inspection systems.

For general-purpose machine vision inspection systems that are intended to be rapidly programmable for a wide variety of workpieces, as exemplified by the previously referenced QUICK VISION® series of PC-based vision systems, it has been conventional for image acquisition operations to be interspersed with image analysis operations and/or feature inspection operations that are performed on the most recently acquired image (referred to herein as "interspersed" type operations.) However, there is an increasing demand for general-purpose machine vision inspection systems to provide higher throughput. According to one method, this may be accomplished by performing image acquisition while using continuous relative motion between the camera and the workpiece stage (as opposed to intermittently stopping and starting the relative motion, as required for interspersed type operations), thereby significantly increasing inspection throughput. Such operations are referred to herein as continuous-motion type operations. It is advantageous for such systems to include strobe lighting illumination to assist with the acquisition of images during continuous motion without smearing (or blurring) the image.

High-speed "in-line" vision inspection systems used in high-speed production lines have provided continuous-motion type image acquisition. However, such in-line vision systems typically are dedicated to a single production line and acquire the "same" image over and over again, for successive workpieces on a conveyor system, for example. In such cases, for each image the motion speed and strobe illumination parameters, etc., are the same. Furthermore, workpiece configurations and/or image acquisition parameters, etc., are rarely changed. Thus, programming methods for such systems have not facilitated rapid programming for an unlimited variety of workpieces, camera positions, image acquisition parameters, etc., by relatively unskilled users.

In contrast, experience has shown that it is essential for general-purpose machine vision inspection systems to facilitate rapid programming for an unlimited variety of workpieces, camera positions, image acquisition parameters, etc., by relatively unskilled users. Previous programming methods for general-purpose machine vision inspection systems have not made the programming of continuous-motion type operations sufficiently easy or fast. Furthermore, previous programming methods have not made the programming of continuous-motion type operations in combination with interspersed-type operations sufficiently easy or fast. Programming systems and methods that can overcome these problems and shortcomings, either separately or in combination, would be desirable.

SUMMARY OF THE INVENTION

For the conventional vision systems in which image acquisition operations are interspersed with image analysis operations and/or feature inspection operations, a user typically creates a part program during "learn mode" by defining each image acquisition (for example, by controlling the vision system position, focus, magnification, lighting conditions, etc., to achieve a desired image on a video display) and then immediately defining operations based on that image, such as workpiece image inspection or analysis operations, etc. For many commercially available machine vision systems, such learn mode operations are then automatically or semi-automatically converted into corresponding part programming instructions by the machine vision system. This type of learn mode operation sequence, referred to herein as the "ordinary" or "interspersed" learn mode, is schematically illustrated in FIGURE IA. In this example, in the ordinary learn mode, at a block 2, a user first defines (or has the vision system "learn") how to acquire image C1 (e.g., how to position the camera relative to the workpiece, what light sources and lighting control parameters to use, etc.), and then defines (or has the vision system "learn") the operations that are to be performed based on the acquired image C1 (the "image C1 operations"), for example, inspection or analysis operations, etc. Next, at a block 4, the user first defines (or has the vision system "learn") how to acquire image C2, and then defines (or has the vision system "learn") the operations that are to be performed based on the acquired image C2 (the "image C2 operations"), and so forth. Next, at a block 6, the user defines (or has the vision system "learn") how to acquire image I1, and then defines (or has the vision system "learn") the operations that are to be performed based on the acquired image I1 (the "image I1 operations"), and so forth. Next, at a block 8, the user defines an "image independent" operation, for example, a simple instruction or command to set the coordinate system origin at a particular location. Next, at blocks 10 and 12, the user defines operations similar to those previously described for blocks 2 and 4. According to conventional programming techniques, a part program created based on the foregoing examples of interspersed learn mode operations will perform the defined operations in a similar sequence of interspersed operations.

However, in order to provide increased throughput, it is often desirable to program a machine vision inspection system to perform multiple consecutive image acquisition operations using continuous motion and subsequently perform image analysis/inspection operations, etc., on those acquired images, in a "non-interspersed" manner. This type of programmed operation sequence is illustrated in FIG. 1B, which schematically shows how a "continuous motion" or moving image acquisition portion of a program may be provided by programming at least some of the image acquisition operations defined during learn mode operations that are compatible with moving image acquisition (generally referred to as "compatible" or "compatible type" operations herein), which in this example are taken to be the image acquisition operations described with reference to blocks 2, 4, 10 and 12 of FIG. 1A, to be arranged according to a non-interspersed type of sequence shown at blocks 14 and 20 of FIG. 1B. Identifying "compatible" operations is described in greater detail further below.

Briefly stated, in this example, as the operations of block 2 are entered, the compatible C1 image acquisition operations are arranged into a non-interspersed instruction block 14 and the associated compatible C1 operations on that image are arranged into a subsequent instruction block 16. Next, as the operations of block 4 are entered, the compatible C2 image acquisition operations are arranged as the next elements into the non-interspersed instruction block 14 and the associated compatible type C2 operations on that image are arranged as the next elements in the subsequent instruction block 16.

As shown in FIG. 1A, the compatible type operations of blocks 2 and 4 are followed by the operations of blocks 6 and 8, which are taken to be operations that are not compatible with a continuous motion type of moving image acquisition sequence (generally referred to as "incompatible" or "incompatible type" operations herein). Identifying "incompatible" operations is described in greater detail further below. Briefly stated, in this example, as the incompatible operations of block 6 are entered, they cause the non-interspersed instruction blocks 14 and 16, which include compatible operations, to be terminated. The instructions corresponding to the incompatible image I1 operations are arranged into an instruction block 18 in a conventional "interspersed" manner. In this case, the I1 image acquisition operation are followed by any associated incompatible image I1 operations on that image. Next, as an image-independent incompatible operation, such as a command to set/reset the current coordinate system origin at a particular point in the global coordinate system, or the like, is entered at block 8, the associated instructions are simply arranged as the next elements in the interspersed instruction block 18.

As shown in FIG. 1A, the incompatible type operations of blocks 6 and 8 are followed by the operations of blocks 10 and 12, which, in this example, are taken to be operations that are compatible with a continuous motion type of moving image acquisition sequence. Thus, the associated instruction are programmed into the non-interspersed instruction blocks 20 and 22, in the manner previously described for the compatible operation blocks 2 and 4 and the associated non-interspersed instruction blocks 14 and 16.

Generally speaking, in the programming structure or arrangement shown schematically in FIG. 1B, at least some of the compatible type image analysis and/or inspection operations defined during learn mode operations, are programmed to be performed by acquiring a plurality of images using continuous motion, then subsequently recalling those images and performing the associated analysis/inspection operations. It should be appreciated that the example shown in FIGS. 1A and 1B is just one example of a sequence of operations that is useful for illustrating terminology and concepts described in greater detail below. For example, it should be appreciated that if additional compatible operations similar to blocks 2 or 4 were performed following block 4 and before incompatible operation block 6, then the corresponding instructions would continue to be arranged as the next elements in the non-interspersed instruction blocks 14 and 16, before those blocks are terminated by the incompatible operations of block 6. Also, it should be appreciated that although the instructions corresponding to the incompatible operations of blocks 6 and 8 have been described as forming a "block" 18, this is simply a convenient way of describing that these operations are all of the same "incompatible" type and that as long as the sequence of incompatible operations is not "interrupted" by a compatible operation, they are programmed from one to the next in an interspersed manner. The same arrangement of instructions might alternatively be described and illustrated as a sequence of independent interspersed-type instruction blocks, respectively associated with each respective incompatible operation entered in learn mode.

The programming systems and methods disclosed herein accept multiple image acquisition operations interspersed with associated image analysis and/or inspection operations during learn mode operations and create a part program wherein the image acquisition operations for at least some of the images are arranged into a continuous motion image acquisition sequence that acquires images in a "non-interspersed" manner and the associated image analysis/inspection operations are performed subsequently on those acquired images.

According to a further aspect of the invention, in various embodiments, the programming systems and methods disclosed herein may operate automatically to facilitate rapid programming for a variety of workpieces by relatively unskilled users, wherein the resulting programs include continuous motion image acquisition sequences.

As previously outlined with reference to blocks 6 and 8 of FIG. 1A and block 18 of FIG. 1B, not all image acquisition operations and associated image analysis and/or inspection operations are suited to being segregated into continuously motion image acquisition sequences and subsequent image analysis sequences. For example, if an image of a certain point on a workpiece is to be acquired at a magnification that is different from a previous image, then certain hardware adjustments to change the magnification must occur prior to acquiring such an image. Assuming that the hardware adjustment takes time (perhaps an unspecific amount of time, depending on each vision system), it would be best to stop the camera movement during the hardware adjustment to ensure that the hardware adjustment is complete when the image acquisition actually takes place. Thus, this type of image acquisition operation is incompatible with continuous (moving) image acquisition, and such an operation (perhaps as combined with an associated image analysis/inspection operation) is an incompatible image acquisition operation, or an incompatible operation, for short. In general, for incompatible operations, the continuous relative motion between the camera and the workpiece must be stopped (or interrupted) to insure that proper image acquisition conditions are obtained and/or that certain image analysis or inspection operations are performed according to a required sequence as a pre-condition to obtaining the appropriate results from subsequent image acquisition and/or analysis operations.

The programming systems and methods disclosed herein accept multiple image acquisition operations interspersed with associated image analysis and/or inspection operations during learn mode operations and create a part program wherein the image acquisition operations for at least some of the images are arranged into a continuous motion image acquisition sequence that acquires images in a "non-interspersed" manner and the associated image analysis/inspection operations are performed subsequently on those acquired images, and wherein the part program is further created to include one or more portions wherein certain other image acquisition operations and the associated image analysis and/or inspection operations are interspersed, at least when such operations are incompatible with continuous motion image acquisition.

According to a further aspect of the invention, the programming systems and methods disclosed herein may operate automatically to facilitate rapid programming for a variety of workpieces by relatively unskilled users, wherein the resulting programs include both non-interspersed continuous motion image acquisition sequences, as well as any necessary interspersed image acquisition and analysis or inspection operation sequences.

The programming systems and methods disclosed herein allow a user to program a general-purpose machine vision inspection system using a consistent learn mode procedure regardless of whether certain image acquisition operations are to be interspersed with (or "interrupted" by) image analysis and/or feature inspection operations (in the conventional manner), or whether continuous relative motion is used to provide higher throughput by acquiring certain images without interspersing image analysis operations that interrupt image acquisition operations.

According to a further aspect of the invention, the programming systems and methods disclosed herein automatically re-sequence certain learn mode operations that were performed in an interspersed manner, to provide at least one programmed non-interspersed continuous motion image acquisition sequence, while certain incompatible learn mode operation sequences are programmed as interspersed sequences.

More generally, the present invention offers methods and systems that permit a user to define both compatible and incompatible operations during learn mode, and produce a part program that incorporates moving image acquisition sequences as much as possible while at the same time ensuring to interrupt the moving image acquisition whenever an incompatible operation is called for. In various exemplary embodiments, the system provides such a program in a manner that is fully transparent to the user, that is, the user need not consider whether various operations are compatible or incompatible.

In various exemplary embodiments, a user interface is provided that allows the user to determine whether the machine vision inspection system operates in a mode that automatically re-sequences certain compatible learn mode operations that were performed in an interspersed manner, to provide at least one programmed non-interspersed continuous motion image acquisition sequence, or whether the machine vision inspection system operates in a conventional mode to create a part program that generally consists of the conventional type of interspersed program instructions.

The methods of the present invention may be embodied in a computer-readable medium and/or a carrier wave or other signal comprising computer executable instructions for performing the method, and the instructions may be loaded to and executed by a control system portion of a precision machine vision inspection system.

In some embodiments, the present invention includes a method of interpreting and/or compiling computer executable instructions for controlling a precision machine vision inspection system to inspect a workpiece, comprising generally two steps. First, the method permits a user to define both compatible and incompatible operations without intentionally segregating the operations. Second, the method automatically arranges the user-defined operations into different types of program instructions. A first type of instructions comprises a moving image acquisition instruction sequence or routine and an associated image analysis/inspection instruction sequence or routine that is executed at some time after images are available based on the image acquisition instruction sequence. The moving image acquisition routine comprises a set of machine control instructions for acquiring a set of workpiece images while maintaining a relative motion between the camera and the workpiece stage. The image analysis/inspection routine consists of a set of machine control instructions for analyzing/inspecting the acquired set of workpiece images. A second type of instructions comprises at least one instruction sequence or routine that controls the machine vision inspection system to perform at least one "incompatible operation", that is, an interspersed sequence of image acquisition and analysis or inspection operations that is incompatible with maintaining a relative motion between the camera and the workpiece.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1A:
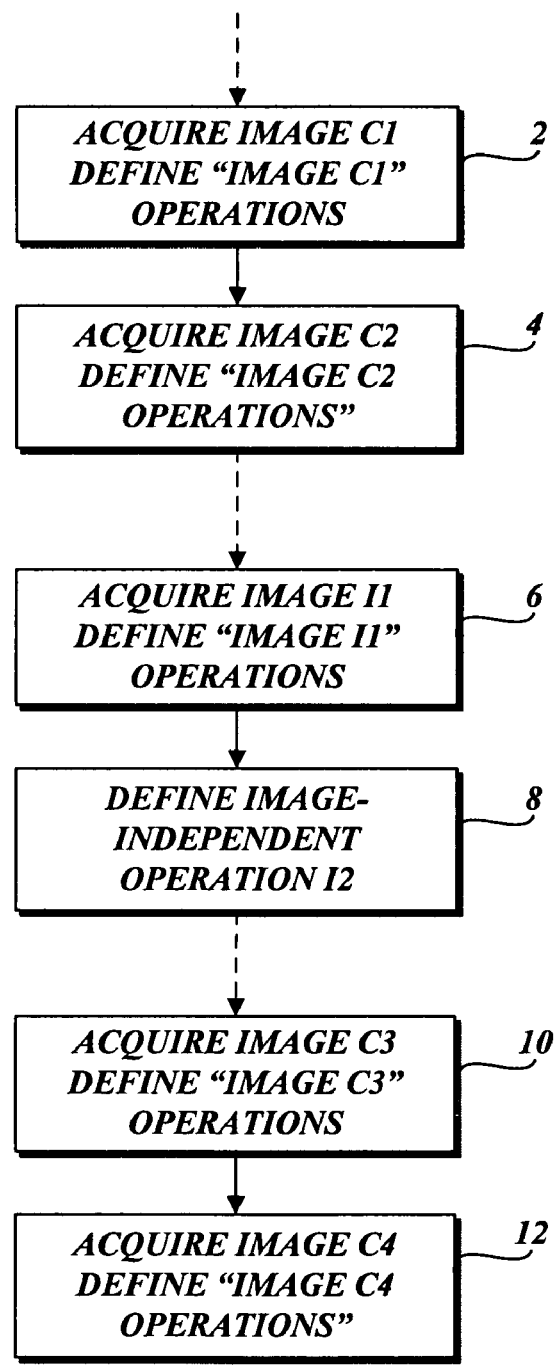
FIG. 1A schematically represents an ordinary or interspersed operation sequence entered in learn mode.
Figure 1B:
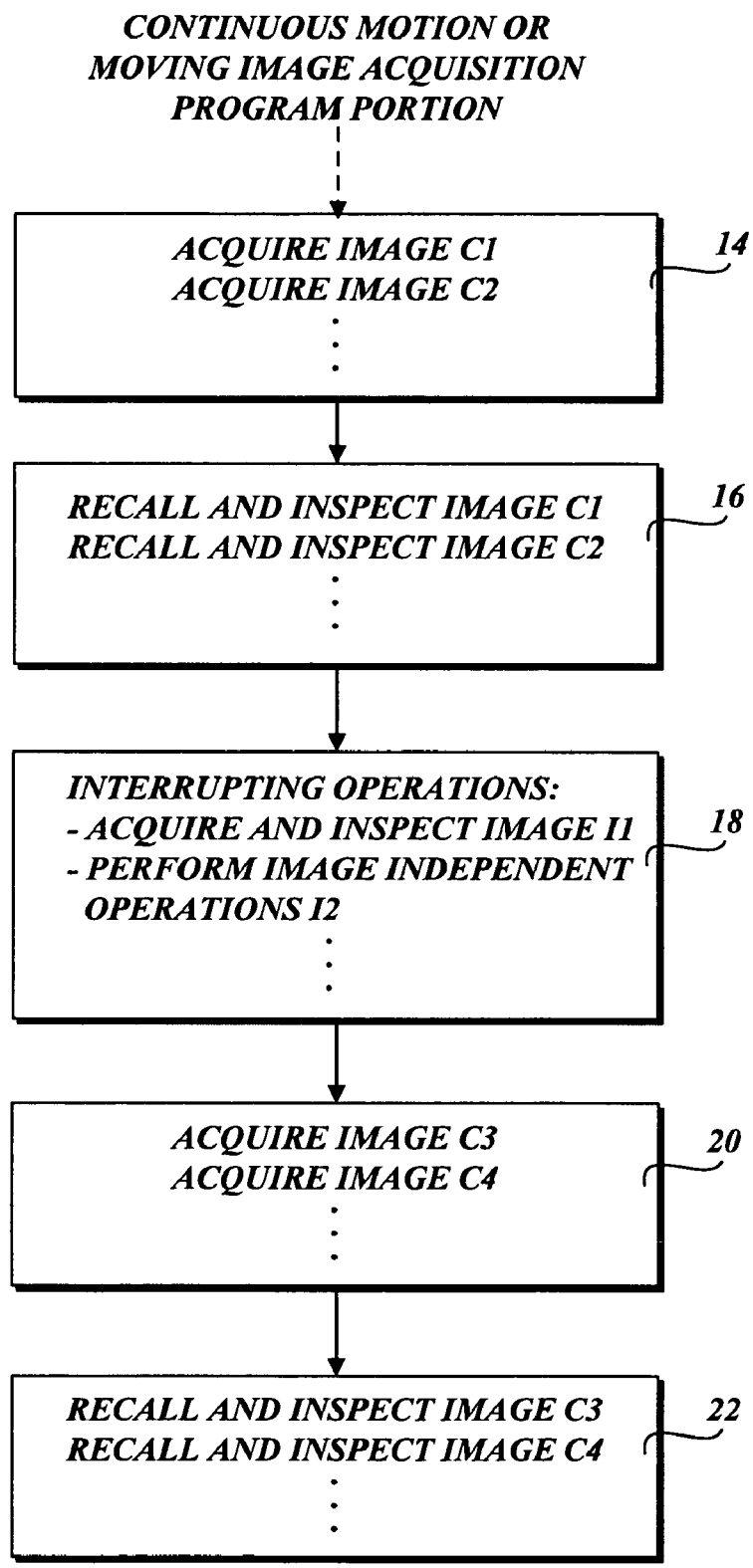
FIG. 1B schematically represents one exemplary structure for a program portion comprising non-interspersed continuous motion image acquisition operations derived from the interspersed operation sequence of FIG. 1A.
Figure 2:
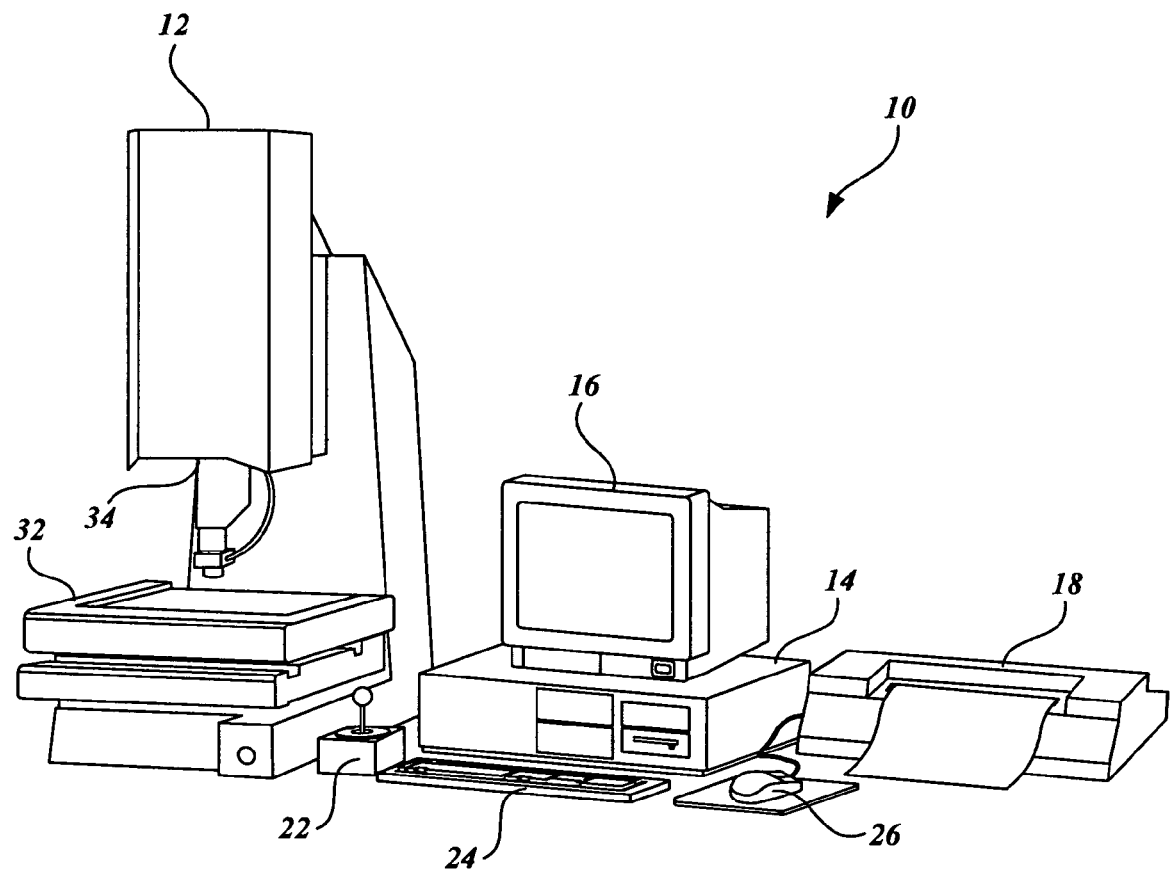
FIG. 2 is an illustration of a machine vision inspection system.

FIG. 2 is a block diagram of one exemplary machine vision inspection system 10 in accordance with the present invention. The machine vision inspection system 10 includes a vision measuring machine 12 that is operably connected to exchange data and control signals with a controlling computer system 14. The controlling computer system 14 is further operably connected to exchange data and control signals with a monitor 16, a printer 18, a joystick 22, a keyboard 24, and a mouse 26. The vision measuring machine 12 includes a moveable workpiece stage 32 and an optical imaging system 34 which may include a zoom lens or interchangeable lenses. The zoom lens or interchangeable lenses generally provide various magnifications for the images provided by the optical imaging system 34.

The joystick 22 can typically be used to control the movement of the movable workpiece stage 32 in both X and Y directions, which are generally parallel to the focal plane of the optical imaging system 34. The joystick 22 can also control the movement of the movable optical imaging system 34 in the Z or focus direction. The joystick 22 may be provided in a form other than that shown, such as any visual representation or widget on the monitor 16 which is intended to function as a "virtual motion control device" of the machine vision inspection system 10 and is controllable through any computer input device such as the mouse 26 or the like.

Figure 3:
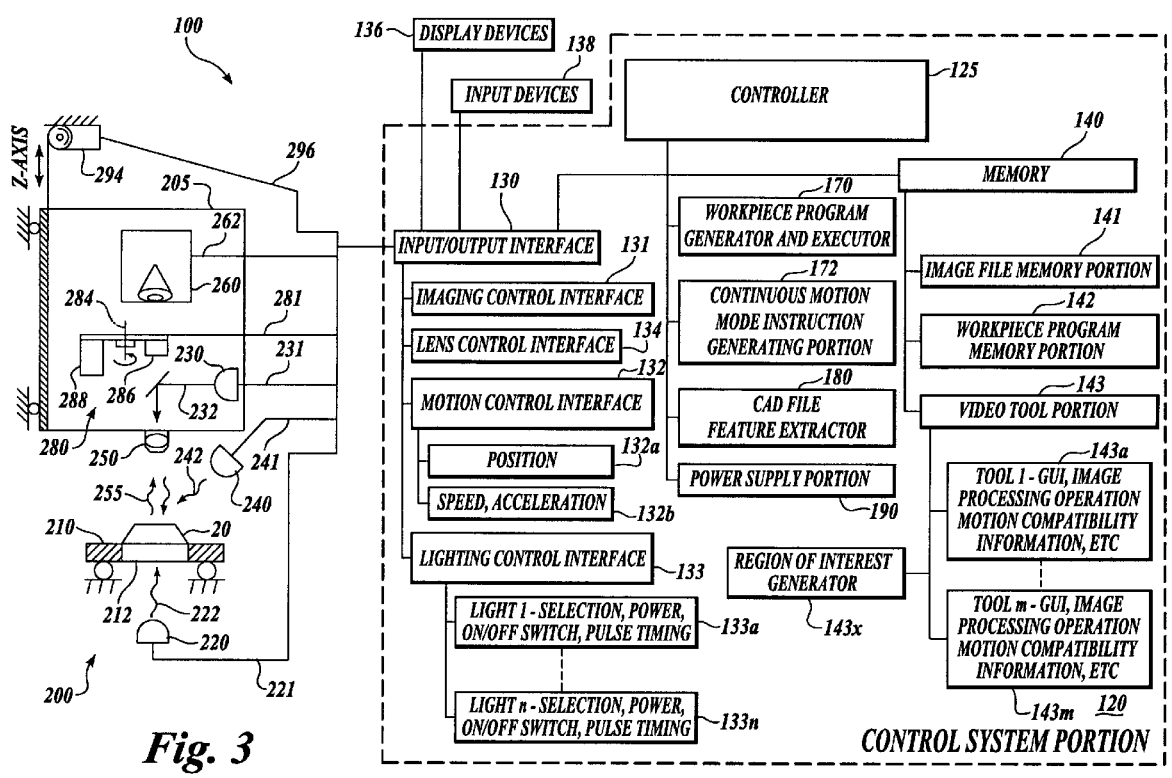
FIG. 3 is a diagram of a control system portion and a vision components portion of a machine vision inspection system.

FIG. 3 is a diagram of a control system portion 120 and a vision components portion 200 of a machine vision inspection system 100 in accordance with the present invention. As will be described in more detail below, the control system portion 120 is utilized to control the vision components portion 200. The vision components portion 200 includes an optical assembly portion 205, light sources 220, 230 and 240, and a workpiece stage 210 having a central transparent portion 212. The workpiece stage 210 is controllably movable along X and Y axes that lie in a plane that is generally parallel to the surface of the stage where a workpiece 20 may be positioned. The optical assembly portion 205 includes a camera system 260, an interchangeable objective lens 250, a turret lens assembly 280, and the coaxial light source 230. The optical assembly portion 205 is controllably movable along a Z axis that is generally orthogonal to the X and Y axes, by using a controllable motor 294.

A workpiece 20 that is to be imaged using the machine vision inspection system 100 is placed on the workpiece stage 210. One or more of the light sources 220, 230 and 240 emits source light 222, 232, or 242, respectively, that is usable to illuminate the workpiece 20. Light emitted by the light sources 220, 230 and/or 240 illuminates the workpiece 20 and is reflected or transmitted as workpiece light 255, which passes through the interchangeable objective lens 250 and the turret lens assembly 280 and is gathered by the camera system 260. The image of the workpiece 20, captured by the camera system 260, is output on a signal line 262 to the control system portion 120.

The light sources 220, 230, and 240 that are used to illuminate the workpiece 20 can include a stage light 220, a coaxial light 230, and a surface light 240, such as a ring light or a programmable ring light, all connected to the control system portion 120 through signal lines or busses 221, 231 and 241, respectively. As a primary optical assembly of the machine vision inspection system 100, the optical assembly portion 205 may include, in addition to the previously discussed components, other lenses, and other optical elements such as apertures, beamsplitters and the like, such as may be needed for providing coaxial illumination, or other desirable machine vision inspection system features. As a secondary optical assembly of the machine vision inspection system 100, the turret lens assembly 280 includes at least a first turret lens position and lens 286 and a second turret lens position and lens 288. The control system portion 120 rotates the turret lens assembly 280 along axis 284, between at least the first and second turret lens positions, through a signal line or bus 281.

The distance between the workpiece stage 210 and the optical assembly portion 205 can be adjusted to change the focus of the image of the workpiece 20 captured by the camera system 260. In particular, in various exemplary embodiments, the optical assembly portion 205 is movable in the vertical Z axis direction relative to the workpiece stage 210 using a controllable motor 294 that drives an actuator, a connecting cable, or the like, to move the optical assembly portion 205 along the Z axis. The term Z axis, as used herein, refers to the axis that is intended to be used for focusing the image obtained by the optical assembly portion 205. The controllable motor 294, when used, is connected to the input/output interface 130 via a signal line 296.

As shown in FIG. 3, in various exemplary embodiments, the control system portion 120 includes a controller 125, an input/output interface 130, a memory 140, a workpiece program generator and executor 170, a CAD file feature extractor 180, and a power supply portion 190. It will be appreciated that each of these components, as well as the additional components described below, may be interconnected by one or more data/control buses and/or application programming interfaces, or by direct connections between the various elements.

The input/output interface 130 includes an imaging control interface 131, a motion control interface 132, a lighting control interface 133, and a lens control interface 134. The motion control interface 132 includes a position control element 132a, and a speed/acceleration control element 132b. However, it should be appreciated that in various exemplary embodiments, such elements may be merged and/or indistinguishable. The lighting control interface 133 includes light control elements 133a-133n which control, for example, the selection, power, on/off switch, and strobe pulse timing if applicable, for the various corresponding light sources of the machine vision inspection system 100, such as the light sources 220, 230, and 240.

The memory 140 includes an image file memory portion 141, a workpiece program memory portion 142, and a video tool portion 143. The video tool portion 143 includes tool portions 143a-143m, which determine the GUI, image processing operation, etc., for each of the corresponding tools. Any of tool portions 143a-143m may also include motion compatibility information usable to determine whether the operations associated with the video tool are compatible with a moving image acquisition mode of operation, so that the tool can be properly programmed according to the principles of this invention, as outlined in greater detail below. In some implementations, the motion compatibility information may be inherent in the general operation instructions associated with the tool, and general operation instructions may be analyzed by a continuous motion mode instruction generating portion 172 of the workpiece program generator and executor 170, in order to determine whether they are compatible with a continuous motion mode of operation. In other implementations, the motion compatibility information may comprise specific motion compatibility information such as a pre-determined compatibility or incompatibility code, or a program branching, address, or subroutine selecting instruction. In either case, the motion compatibility information causes the video tool operations to be programmed in the appropriate interspersed or non-interspersed manner by the continuous motion mode instruction generating portion 172 of the workpiece program generator and executor 170, as previously outlined and discussed in greater detail below. The video tool portion 143 also includes a region of interest generator 143x that supports automatic, semi-automatic and/or manual operations that define various regions of interest that are operable in various video tools included in the video tool portion 143. In general, the memory portion 140 stores data usable to operate the vision system components portion 200 to capture or acquire an image of the workpiece 20 such that the acquired image of the workpiece 20 has desired image characteristics. The memory portion 140 further stores data usable to operate the machine vision inspection system 100 to perform various inspection and measurement operations on the acquired images, either manually or automatically, and to output the results through the input/output interface 130. The memory portion 140 also contains data defining a graphical user interface operable through the input/output interface 130.

The signal lines or busses 221, 231 and 241 of the stage light 220, the coaxial light 230, and the surface light 240, respectively, are all connected to the input/output interface 130. The signal line 262 from the camera system 260 and the signal line 296 from the controllable motor 294 are connected to the input/output interface 130. In addition to carrying image data, the signal line 262 may carry a signal from the controller 125 that initiates image acquisition.

One or more display devices 136 and one or more input devices 138 can also be connected to the input/output interface 130. The display devices 136 and input devices 138 can be used to view, create and/or modify part programs, to view the images captured by the camera system 260, and/or to directly control the vision system components portion 200.

With regard to the CAD file feature extractor 180, information such as a CAD file representing a workpiece, or a previous image of a substantially identical workpiece, is frequently available in industrial applications of machine vision inspection systems. In such cases, the CAD file representation or previous image may be used to facilitate off-line part programming.

The control system portion 120 is usable to determine image acquisition settings and/or acquire an image of the workpiece 20 such that the input image of the workpiece 20 has desired image characteristics in a region of interest that includes a workpiece feature to be inspected. In various exemplary embodiments, when a user uses the machine vision inspection system 100 to create a workpiece image acquisition program for the workpiece 20, the user generates workpiece program instructions either by explicitly coding the instructions automatically, semi-automatically, or manually, using a workpiece programming language, or by generating the instructions by moving the machine vision inspection system 100 through an image acquisition training sequence such that the workpiece program instructions capture the training sequence as outlined above. In particular, these instructions will cause the machine vision inspection system to manipulate the workpiece stage 210 and/or the camera system 260 such that a particular portion of the workpiece 20 is within the field of view of the camera system 260 and at a desired focus state. The instructions will also select a lens having a desired magnification and activate one or more of the light sources 220-240 to provide a desired illumination of the workpiece 20 during image acquisition. In general, the instructions will also define various analysis or inspection operations to be performed on the resulting image. Furthermore, as will be more fully described below with reference to FIGS. 4A-5B, the present invention offers methods that permit the user to enter a mixture of operations that are either compatible or incompatible with moving image acquisition during learn mode operations, and the corresponding operations will be automatically programmed into a part program that includes continuous motion image acquisition sequences, in order to increase throughput during execution of the part program. In general, for a set of workpiece images acquired as part of a continuous motion image acquisition sequence, the control system 120 commands the camera system 260 to capture each image of the workpiece 20 in the set and output the captured images to the control system portion 120. The control system portion 120 will then, under control of the controller 125, input the captured images through the input/output interface 130 and store the captured images in the image file memory portion 141 for subsequent analysis or inspection. The controller 125 may also display the captured images on the display device 136.

The control system portion 120 is usable to analyze and inspect workpiece features in such workpiece inspection images, or in images acquired during non-compatible operations, and to store and/or output the inspection results or perform other appropriate operations based on the analysis or inspection results. In various exemplary embodiments, when a user uses the machine vision inspection system 100 to create a workpiece image analysis/inspection program for the workpiece 20 according to this invention, the user typically generates program instructions by moving the machine vision inspection system 100 through an image acquisition and analysis/inspection training sequence such that the workpiece program instructions capture the training sequence and various systems and methods according to this invention arrange the associated part program instructions to facilitate increased inspection throughput as outlined above and described in greater detail below.

Generally speaking, for non-compatible operations, such as autofocus operations or part coordinate system determination operations, for example, the required image acquisition(s) and associated analysis/inspection operation(s) will be performed in an interspersed, sequential, or nearly sequential manner. Generally speaking, for operations compatible with a moving image acquisition mode of operation, these instructions will cause the machine vision inspection system to first sequentially acquire or capture and store a set of images without interrupting the acquisition sequence to perform analysis or inspection operations, that is, in a non-interspersed manner, and later recall the captured workpiece inspection image stored in the image file memory portion 141 of the memory 140 and perform various analysis/inspection operations on the images using the capabilities provided by various video tools included in the video tool portion 143 of the memory 140. This process is repeated for multiple images in the set of images that were captured. In general, the vision system can acquire such a set of images more rapidly because it can continuously move the camera relative to the workpiece during the image acquisition. Various general considerations related to "non-interspersed" moving image acquisition operations may be better understood with reference to co-assigned, co-pending U.S. patent application Ser. No. 10/435,625, which is hereby incorporated herein by reference in its entirety. However, it should be appreciated that although a moving image acquisition sequence and the subsequently performed analysis/inspection operations are generally described as isolated modes of operation in the '625 Application, according to the principles of the present invention such non-interspersed operations may occur in one or more sequences of non-interspersed operations that are included in the same part program with "interrupting" operation sequences as previously outlined herein and described in greater detail below. Thus, the description included in the '625 Application supplements this disclosure, but it is not to be understood to constrain the present invention, which is more general in its scope and application.

Some of the types of video tools that may be compatible with a moving image acquisition mode of operation may include, for example, shape or pattern matching tools, edge and/or boundary detection tools, circle and dimension measuring tools, and the like. Such tools are routinely used and included in a variety of commercially available machine vision inspection systems, such as the QUICK VISION® series of vision systems and the associated QVPAK® software discussed above. For each image in the set of images, in one embodiment, the control system 120 will output the results of each analysis/inspection operation to the input/output interface for outputting to various display devices 136, which may include video display, printers, and the like. The control system 120 may also store the results of each inspection operation in the memory 140.

As previously mentioned, it is desirable that a user be able to program a general-purpose machine vision inspection system using a consistent programming procedure regardless of whether image acquisition operations are to be interspersed with (or "interrupted" by) image analysis and/or feature inspection operations (in the conventional manner), or whether continuous relative motion is used in order to provide higher throughput by acquiring one or more images without interspersing image analysis operations that interrupt image acquisition operations. For example, if an image of a certain point in a workpiece is to be acquired at a different magnification from the rest of the workpiece, then certain hardware adjustments to change the magnification, and possibly to readjust the focus by autofocusing, must occur prior to acquiring such an image. Assuming that the hardware adjustment takes time (perhaps an unspecific amount of time depending on each vision system), in some cases it may be a simpler, more conservative and more robust programming practice to stop the camera movement at the desired image acquisition location, to ensure that there is adequate time for hardware adjustment to be completed and the associated image acquired at the desired location, before motion continues past that image acquisition location. Thus, these types of hardware adjustment operations must be performed prior to acquiring the associated image at the desired magnification and may be incompatible with continuous (moving) image acquisition. In other words, any preceding continuous relative motion image acquisition sequence must be stopped (or interrupted) prior to and during performance of such incompatible operation(s) (in this case the magnification alteration and/or autofocus operations), then, if subsequent operations are compatible with a moving image acquisition, a subsequent moving image acquisition mode of operations may be initiated or resumed.

The present invention is directed to improving the part programming available for continuous-motion type vision systems, by automatically generating part programs that generally include the two previously discussed types of operations: compatible operations to be performed in a manner that includes moving image acquisition sequences, and incompatible (interrupting) operations, without requiring the user to distinguish between the two types of operations during learn mode operations. In various embodiments, the user need not manually (or consciously) switch or change their style of learn mode operation input in order to define a program that arranges compatible operation sequences along with incompatible operations in a part program. In various embodiments, a method of the present invention is embodied in computer executable instructions stored in the workpiece program generator and executor 170 and/or its continuous motion mode instruction generating portion 172.

In one alternative implementation the method generally includes three steps. First, the system enters a moving image acquisition or continuous motion learn mode, wherein acquisition and analysis/inspection of a set of images compatible with moving image acquisition can be defined.

Second, for each of the image acquisition and associated analysis/inspection operations to be defined, it is determined if the operation is compatible with moving image acquisition. If the operation (or a set of operations) is determined to be compatible, the associated image acquisition is included in a moving image acquisition sequence, which comprises a set of machine control instructions for acquiring and storing a set of workpiece images. Also, the associated analysis/inspection operations are included in an image recall and analysis sequence, which comprises a set of machine control instructions for recalling and analyzing/inspecting the set of stored workpiece images. If, on the other hand, the operation is determined to be incompatible with moving image acquisition, then a set of instructions is established that executes outside of the moving image acquisition sequence, which comprises a set of machine control instructions for performing the incompatible operation including both acquisition and analysis/inspection of an image or images. The second step is repeated as necessary in order to program each of the part program operations to be defined for the workpiece.

Third, all of the determined instruction sequences are stored as part of a workpiece part program for the workpiece.

In another alternative implementation, an automatic part program generation system or method is structured such that once an operation is determined to be incompatible with moving image acquisition, the part program generation system or method automatically exits a moving image acquisition sequence programming mode to permit the user to define the incompatible operation outside that mode (e.g., in the ordinary "interspersed" learn mode). Likewise, after the incompatible operation is defined, if another operation (or a set of operations) is determined to be compatible with moving image acquisition, the system or method automatically reenters the moving image acquisition sequence programming mode to define sequential acquisition of a set of images and the subsequent recall and analysis/inspection operations. In various exemplary embodiments, the exiting from and (re) entry into the moving image acquisition sequence programming mode is fully transparent to the user, who may simply follow ordinary learn mode programming procedures, while the part programming systems and methods according to this invention automatically streamline certain compatible operations to include one or more continuous motion image acquisition sequences.

In various implementations, the determination as to whether an operation is compatible or incompatible with moving image acquisition is made automatically without a user input. For example, a set of operations associated with a video tool or the like may be predetermined as incompatible with moving image acquisition and related predetermined information such as an "incompatibility flag" or a pre-structured instruction sequence, may be stored in the system memory, for example in the video tool memory portion 143, or the like. Based on such information the workpiece program generator and executor 170 can automatically exit a moving image acquisition programming mode, for example by controlling or disabling operation of the continuous motion mode instruction generating portion 172, whenever a user requests to define one of these predetermined incompatible operations, and generate the appropriate "interspersed" operation sequence. In an alternative implementation, the continuous motion mode instruction generating portion 172 may be structured to analyze the inherent operations for a video tool or other machine vision inspection system tool and determine whether they are compatible with a moving image acquisition sequence, and generate the appropriate "non-interspersed" or "interspersed" operation sequence, accordingly. For example, some of the operations that can be either predetermined or analyzed by the continuous motion mode instruction generating portion 172 as incompatible with moving image acquisition in various alternative embodiments may include: (1) a variable motion operation which involves moving the camera relative to the workpiece but the actual relative movement may vary depending on each execution at run time, (2) an operation whose time for completion depends on the particular system's hardware specifics, (3) an operation that requires information to be derived from immediate image analysis at run time, (4) an operation that involves taking plural images at the same location on the workpiece, and (5) "image independent" coordinate system changes, e.g., in various embodiments, an instruction to "Translate" the coordinate system origin to a global or current coordinate of (100,0,0), and/or "Rotate" the coordinate system by 45 degrees, is treated as an incompatible operation.

Figure 4A:
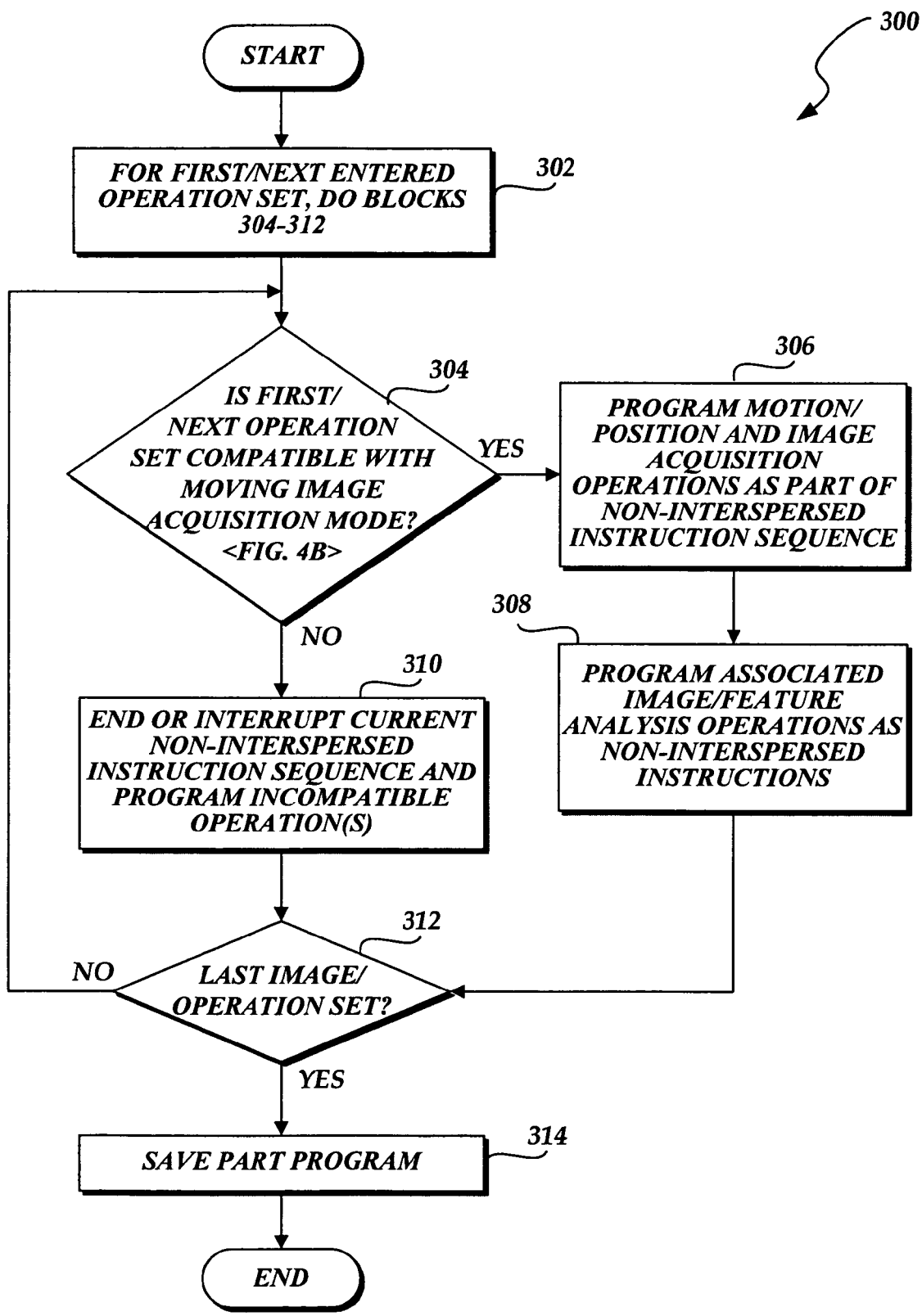
FIG. 4A is a flow diagram illustrative of a method for creating a part program for a vision system that includes continuous-motion image acquisition sequences.

FIG. 4A is a flow diagram illustrative of one exemplary method (or routine) 300 for creating a part program for a vision system that includes continuous-motion image acquisition sequences along with operations incompatible with moving image acquisition. The method or routine 300 generally starts when learn mode operations are started and it is desired that the part program resulting from learn mode operations should include moving image acquisition sequences. At a block 302, for each of a set of image acquisition and analysis/inspection operations to be defined, it is commanded that the following blocks 304-312 are to be performed.

At a decision block 304, it is determined whether the current operation or current operation set to be defined (such as the set of operations associated with a video tool, for example) is compatible with a moving image acquisition sequence or a moving image acquisition mode of operation. As described above, some operations are incompatible with moving image acquisition such that it is advantageous to stop the relative movement between the camera and the workpiece in association with performing such incompatible operations. As yet another example, an operation may be determined to be incompatible if the operation calls for the use of a certain set of hardware systems or hardware operations (e.g., to move a lens system to change magnification), or a certain set of software systems or image processing operations (e.g., to perform an autofocus operation or determine a coordinate system based on a current image when the coordinate system is to be used for future operations, or the like.) In general, it is advantageous to make the determination as to whether a particular operation is compatible or not with moving image acquisition automatically, however, in various embodiments, semi-automatic and/or manual compatibility determination, for at least some operations or applications, is also within the scope of this invention. For example, a user may specify each operation as either compatible or not when defining the operation, according to previously described criteria or any other criteria that the user feels are appropriate. Generally, operations are incompatible with moving image acquisition if they lead to variable results when executed at run time, if they modify the execution of later acquisition or analysis operations (e.g. Part Coordinate System changes or "PCS" changes, described further below), or if they are best executed while the camera is held stationary relative to the workpiece. Compatibility may be indicated and/or chosen, for example, by selecting a checkbox in a graphical user interface window or menu related to the operation, or the like. As another alternative, the determination of compatibility may be made automatically and then confirmed by a user manually or semi-automatically. In various embodiments, a plurality of general categories may be applied to determine whether any operation is compatible or not with moving image acquisition. The operations described with reference to FIG. 4B may be used for the operations of block 304 in various embodiments. However, alternative methods for performing block 304 are also described herein and further alternatives may be devised by one skilled in the art based on the information in this disclosure.

If an operation is determined to be compatible with a moving image acquisition sequence at block 304, then operation proceeds to block 306, where the image acquisition operations are programmed as part of a moving image acquisition sequence and to block 308 where the associated analysis/inspection operations for the image are programmed as part of a sequence of operations that recalls the stored image subsequent to its acquisition and storage, and then analyzes and/or inspects it according to the defined operations. Otherwise, if an operation is determined to be incompatible with a moving image acquisition sequence at block 304, then operation proceeds to block 310, where an image acquisition operation and the associated analysis/inspection operation(s) for the image are programmed as part of a sequence where at least one axis of relative motion is stopped or reduced to an insignificant speed in association with the incompatible image acquisition and analysis/inspection operation. In the embodiment shown in FIG. 4A, if a previous set of operations were programmed as part of a "current" non-interspersed image acquisition sequence, that sequence is generally interrupted or ended by the operations of the block 310.

Following either of the blocks 308 or 310, operation proceeds to decision block 312 where it is determined whether there are additional images acquisitions and/or analysis/inspection operations to be performed. If it is determined at block 312 that there are further operations to be included in the current part program, such as may be indicated by the user entering additional operations in learn mode, for example, then operation returns to block 304 where the method continues. Otherwise, if it is determined at block 312 that there are no further operations to be included in the current part program, such as may be indicated by the user terminating learn mode, for example, then operation proceeds to block 314 where the part program instructions resulting from the previous steps are saved for future use, and the method or routine 300 ends.

Figure 4B:
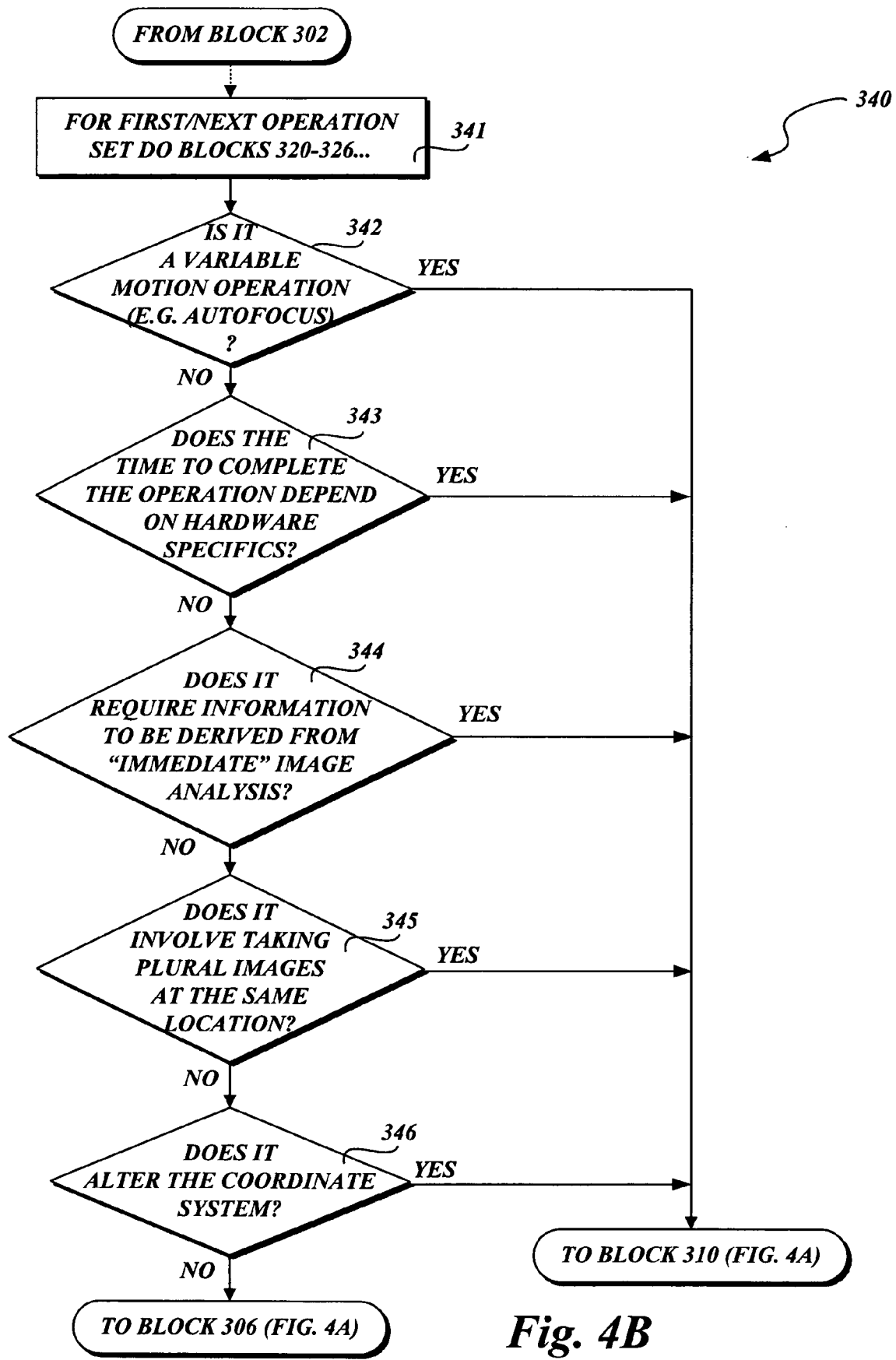
FIG. 4B is a flow diagram illustrative of a method of identifying an incompatible operation, which may be performed at a block 304 of FIG. 4A.

FIG. 4B is a flow chart illustrating one exemplary method or routine 340 for determining whether a particular operation is compatible or not with moving image acquisition. The embodiment shown in FIG. 4B uses five general categories to identify incompatible operations, and is usable to provide one method for performing the block 304 shown in FIG. 4A. The method or routine 340 generally starts when a set of image acquisition and analysis/inspection operations are defined in learn mode, then at block 341 it is commanded that operations corresponding to the following decision blocks 342-346 are to be performed.

At a decision block 342, it is determined whether the current operation, or current operation set, to be defined (such as the set of operations associated with a video tool, for example) includes a variable motion type of operation, i.e., an operation that involves moving or adjusting the camera relative to the workpiece although the actual movement or adjustment may vary at least in part at run time. Examples of variable motion operations include, but are not limited to, an AutoFocus operation and AutoTrace operation. Briefly, the AutoFocus operation involves taking plural images of a portion of the workpiece while adjusting the camera along the Z axis relative to the workpiece, and based on the analysis of the acquired images selecting the camera position that produced the best-focused image. The AutoTrace operation involves following the edge or boundary (or a set of reference points) of an object feature on the workpiece. Both operations are routinely included and used in the QUICK VISION® series of vision systems and the associated QVPAK® software, discussed above. Both of these operations require moving the camera relative to the workpiece, but the precise movement of the camera will vary at run time depending on each workpiece being inspected. Further, during the AutoFocus operation, an optimal focus position (along the Z axis) is best determined when the camera has no X-Y motion relative to the workpiece. Accordingly, variable motion operations are not compatible with a moving image acquisition sequence. Therefore, if an operation is determined to be a variable motion operation at block 342, in various embodiments it is subsequently programmed as an incompatible and/or interspersed set of part program instructions, for example by proceeding to block 310 of FIG. 4A, as shown. One possible embodiment of programming incompatible and/or interspersed part program instructions, as well as compatible and/or non-interspersed part program instructions, is described with reference to FIGS. 5A and 5B, below.

Still referring to FIG. 4B, if at the block 342 it is determined that the operation is not a variable motion type of operation, then operation continues with decision block 343, where it is determined whether the operation is of a type such that the time needed to complete the operation depends on particular hardware systems performance or timing characteristics that vary between specific vision systems or types of visions systems that may be used to implement the part program, or that are otherwise not reliably predictable at the time of part programming. For example, an operation that changes the image the camera sees, and that might not be completed before the associated image is acquired, is incompatible. Examples of such operations include an operation to change the magnification of the vision system, or to rotate the workpiece stage (or index table). Depending on the particular system used, the time involved to complete these operations varies, from time to time even within the same system, and image acquisition will fail to be at the proper location on the workpiece, or may otherwise produce an unpredictable result, if the necessary hardware operation is not completed in time for the image acquisition. Accordingly, in order to provide reasonably simple and robust part programming in various implementations, if the time to complete a particular operation cannot be predicted with sufficient reliability during execution of the program, or it is known that it will take more time than is available before image acquisition is triggered according to some other triggering signal or criterion used in a particular application, then it is determined to be incompatible with moving image acquisition, and it is subsequently programmed as an incompatible and/or interspersed set of part program instructions, for example by proceeding to block 310 of FIG. 4A, as shown.

Still referring to FIG. 4B, if at the block 343 it is determined that the operation is not of a type such that the time needed to complete the operation depends on particular hardware systems performance or timing characteristics, and the time needed for the operation is not otherwise excessive compared to the time required for various moving image acquisition operations, then operation continues with decision block 344, where it is determined whether the current operation requires information to be derived from "immediate" image analysis. If so, such an operation is incompatible with moving image acquisition. Examples of this type of operation include an operation to align a coordinate system (e.g., Part Coordinate System) to a particular set of features located in an image of a current workpiece. For example, this operation involves generally three steps: loading Part Coordinate System (PCS) set up instructions from memory or a disk; aligning the PCS depending on one or more workpiece feature locations determined in a desired workpiece image; and establishing the workpiece image-dependent PCS as the coordinate system to be used when interpreting the coordinate values specified or referenced in subsequent part program instructions within the part program, whether for the same image or additional images. If an operation requires information to be derived and implemented based on such "immediate" image analysis, the operation is determined to be incompatible with moving image acquisition, and is subsequently programmed as an incompatible and/or interspersed set of part program instructions, for example by proceeding to block 310 of FIG. 4A, as shown.

Still referring to FIG. 4B, if at the block 344 it is determined that the operation is not of a type such that it requires "immediate" image analysis, then operation continues with decision block 345, where it is determined whether an operation involves taking plural images at the same location on the workpiece, for example to optimize lighting conditions. Examples of such operations include a Brightness control operation, Dual Area Contrast control operation, and Lighting Wizard operation, or the like. Such operations are exemplified in the previously referenced commercially available QUICK VISION® series of PC-based vision systems and QVPAK® software available from Mitutoyo America Corporation (MAC), located in Aurora, Ill., for example. Briefly, the Dual Area Contrast control operation involves repeated analysis of relative contrast of two adjacent areas in an image, in order to optimize the contrast between them and thus enhance the definition of an edge located between the two areas. The Lighting Wizard operation involves taking several images at different combinations of lighting settings, simulating and interpolating further various combinations of lighting settings by selectively superimposing the images, and identifying a combination of lighting settings based on the best real and/or simulated/interpolated image, such that the lights settings provide optimal or sufficient lighting conditions for acquiring an image. Each of these operations involves taking several images and determining optimal lighting conditions based on the comparative analysis of the several images. These operations are best performed while the camera is held stationary relative to the workpiece so as to obtain several properly comparable images of the same location. Thus, if an operation is determined to be within this category of operations at block 345, the operation is determined to be incompatible with moving image acquisition, and is subsequently programmed as an incompatible and/or interspersed set of part program instructions, for example by proceeding to block 310 of FIG. 4A, as shown.

Still referring to FIG. 4B, if at the block 345 it is determined that the operation is not of a type such that it involves taking plural images at the same location on the workpiece, then operation continues with decision block 346, where it is determined whether an operation alters the coordinate system to be used for subsequent operations. The Part Coordinate System (PCS) operations previously described with reference to block 344 provide one example of such operations. Such operations also include "image independent" coordinate system changes, e.g., in various embodiments, a command to "Translate" the coordinate system origin to a global or current coordinate position of (100,0,0), and/or "Rotate" the coordinate system by 45 degrees. If an operation is determined to be within this category of operations at block 346, the operation is determined to be incompatible with moving image acquisition, and is subsequently programmed as an incompatible and/or interspersed set of part program instructions, for example by proceeding to block 310 of FIG. 4A, as shown. Otherwise, if an operation is determined not to be of any of the respective types of operations analyzed at the respective blocks 342-346, then it is determined to be compatible with a moving image acquisition sequence of operations, and it is subsequently programmed as a compatible and/or non-interspersed set of part program instructions, for example by proceeding to block 306 of FIG. 4A, as shown.

The types incompatible operations described with reference to the five decision blocks 342-346 represent merely exemplary categories for classifying operations into compatible operations and incompatible operations, and other types/categories or combinations of operations may be incompatible with moving image acquisition with regard to various different machine vision systems, video tool implementations, or applications as will be apparent to one skilled in the art based on this disclosure. For example, according to the previous description, PCS operations might alternatively be categorized as either "immediate image analysis" operations, or "coordinate system altering" operations, or both. Similarly, various autofocus operations might alternatively be categorized as either "immediate image analysis" operations, or "plural images at the same location" operations, or both. Therefore, the method of determining whether an operation is compatible with a moving image acquisition sequence or not is not limited to the sample method described with reference to FIG. 4B, and systems that use fewer or more categories, or even methods that do not make use of "categorization" may be devised. Furthermore, while the determination may preferably be made fully automatically in various implementations, it may also be carried out manually, or semi-automatically, in various other implementations or applications.

Figure 5A:
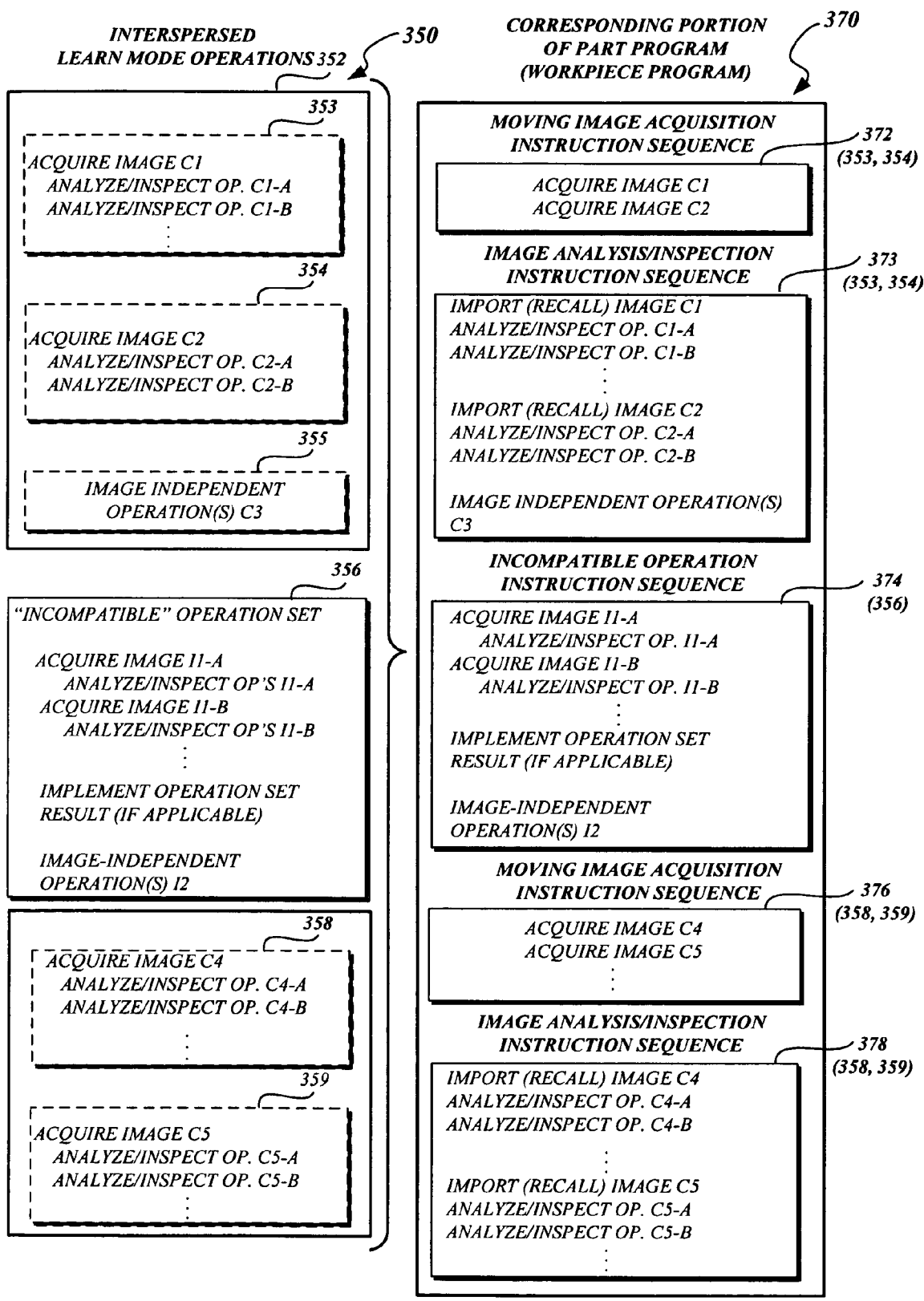
FIG. 5A schematically illustrates a typical learn mode operation sequence, together with a corresponding schematically represented portion of a first embodiment of part program created according to a programming sequence that includes continuous-motion image acquisition sequences.

FIG. 5A schematically illustrates a set of learn mode image acquisition and analysis/inspection operations 350 entered by a user in an interspersed manner, together with a corresponding schematically represented portion of a first embodiment of a set of part program instructions 370 according to one exemplary method of part program instruction sequencing in accordance with this invention. In the learn mode image acquisition and analysis/inspection operations 350, at a block 352, a user enters an interspersed set of image acquisition operations (e.g., how to position the camera relative to the workpiece, what light sources and lighting control parameters to use, etc.) and analysis/inspection operations that include a set of image C1 acquisition and analysis operations 353, a set of image C2 acquisition and analysis operations 354, and a set of C3 image-independent operations 355, each of which are taken here to consist of operations that are compatible with a moving image acquisition sequence of operations according to principles described herein. As reflected in the corresponding set of part program instructions 370, the sets of image C1 and image C2 acquisition and analysis operations, 353 and 354, respectively, have been determined to be of a compatible type of operations, for example according to previously described methods or routines and/or principles, and their corresponding part programming instructions have been arranged into a moving image acquisition instruction sequence 372 which includes instructions for acquiring and storing the respective C1 and C2 images, and into the image analysis/inspection instruction sequence 373, which includes operations that recall the respective C1 image and performs the respective C1-A and C1-B operations and so on, recalls the C2 image and performs the respective C2-A and C2-B operations and so on, corresponding to those defined by the learn mode operations of the respective blocks 353 and 354.

As shown in FIG. 5A, the C3 set of image-independent operations 355 have also been determined to be of a compatible type of operations, for example according to previously described methods or routines and/or principles, and their corresponding part programming instructions have thus been arranged as the next elements in the image analysis/inspection instruction sequence 373. For example, operations such as changing from inches to metric units, output and/or display control operations, and many other type of operations that do not fall into one of the categories previously described with reference to the blocks 342-346 of FIG. 4B, are image-independent compatible operations that might be included in a non-interspersed sequence of operations, either separately, or in combination with image recall and analysis operations as shown in the exemplary non-interspersed sequence block 373.

Next, in the exemplary set of learn mode operations 350, at a block 356 the user enters an interspersed set of image acquisition and analysis/inspection operations that include a set of image I1-A and I1-B acquisition and analysis operations (and so on) which include operations that are incompatible with a moving image acquisition sequence of operations according to principles described herein. Such instructions may in some cases include implementation operations, for example operations to move to a final autofocus position determined based on analysis of images I1A, I1-B, etc. In addition, at the block 356, the user next enters incompatible image-independent operation(s) I2, for example the coordinate system origin translation operation previously described herein, or other operations that do not depend on image information and that fall into one of the categories previously described with reference to the blocks 342-346 of FIG. 4B, or the like.

As reflected in the corresponding set of part program instructions 370, the set of operations performed at block 356 have been determined to be of an incompatible type of operations, for example according to previously described methods or routines and/or principles, and accordingly the corresponding incompatible interspersed image acquisition and analysis/inspection instruction sequence block 374 has been inserted to interrupt or terminate the previous moving image acquisition instruction sequence 372. The instructions corresponding to the incompatible image I1-A, I1-B operations (and so on), as well as any instructions that implement the results of the I1-A and/or I1-B operations (if applicable), as well as the subsequent operations I2, are arranged into the instruction block 374 in a "interspersed" manner. In this case, the I1-A image acquisition operations are followed by any associated incompatible image I1-A operations on that image, next the I1-B image acquisition operations are followed by any associated incompatible image I1-B operations on that image, and by any instructions that implement the results of the previous I1-A and I1-B operations (if applicable), and so on. Next, as the image-independent incompatible operation I2 is entered, the associated instructions are simply arranged as the next elements in the interspersed incompatible instruction block 374.

Next, in the exemplary set of learn mode operations 350, at a block 357 the user enters an interspersed set of image acquisition and analysis/inspection operations that include a set of image C4 acquisition and analysis operations 358 and a set of image C5 acquisition and analysis operations 359, each of which are taken to be operations that are compatible with a moving image acquisition sequence of operations according to principles described herein. Thus, as reflected in the corresponding set of part program instructions 370, the sets of image C4 and image C5 acquisition and analysis operations, 358 and 359, respectively, have been determined to be of a compatible type of operations, for example according to previously described methods or routines and/or principles, and the associated instructions are programmed into a second sequence of non-interspersed instruction blocks 376 and 378, in the manner previously described for the compatible operation blocks 353 and 354 and the associated non-interspersed instruction blocks 372 and 373.

In the schematically illustrated example set of part program instructions 370, instructions corresponding to learn mode operations that are compatible with acquiring and analyzing/inspecting images according to a moving image acquisition sequence have been arranged into the first moving image acquisition instruction sequences 372 and the associated subsequent image analysis/inspection instruction sequence 373, and the second moving image acquisition instruction sequences 376 and the associated subsequent image analysis/inspection instruction sequence 378, so as to continuously acquire as many images as possible using a moving image acquisition method to thereby maximize the inspection throughput. The incompatible operation instruction sequence 374 has been inserted in an arrangement that terminates the previous moving image acquisition instruction sequence 372 (and its associated analysis/inspection instruction sequence 373), for reasons previously described. It should be appreciated that if additional "compatible type" learn mode operations had been entered by a user prior to entering the incompatible operations of block 356, then the moving image acquisition instruction sequence 372, and the corresponding portions of the image (recall and) analysis/inspection instruction sequence 373, could have been extended to include such operations entered prior to the incompatible operations.

The arrangement of the set of part program instructions 370 has been described as having the incompatible operation instruction sequence 374 being inserted in an arrangement that terminates the previous moving image acquisition instruction sequence 372 (and its associated analysis/inspection instruction sequence 373), and the moving image acquisition instruction sequence block 376 (and its associated analysis/inspection instruction sequence 378) has been implied to be a "new" moving image acquisition instruction sequence. However, it should be appreciated that in an alternative description and/or part programming implementation, it might be said that the incompatible operation instruction sequence 374 is inserted in an arrangement that interrupts a moving image acquisition mode of part programming following establishment of the preceding "compatible" block 372 and the associated analysis/inspection instruction sequence 373, and that the incompatible operation instruction sequence 374 is then programmed in a "conventional" part programming mode that provides an interspersed arrangement of image acquisition and analysis/inspection operations, and that the "compatible" blocks operations 358 and 359 are then recognized as compatible operations, and the instruction sequences of the blocks 376 and the associated block 378 are therefore programmed by resuming the moving image acquisition mode of part programming. It should be appreciated the end result of these two alternative descriptions and/or implementations is approximately functionally equivalent, and each is included within the scope of this invention.

Figure 5B:
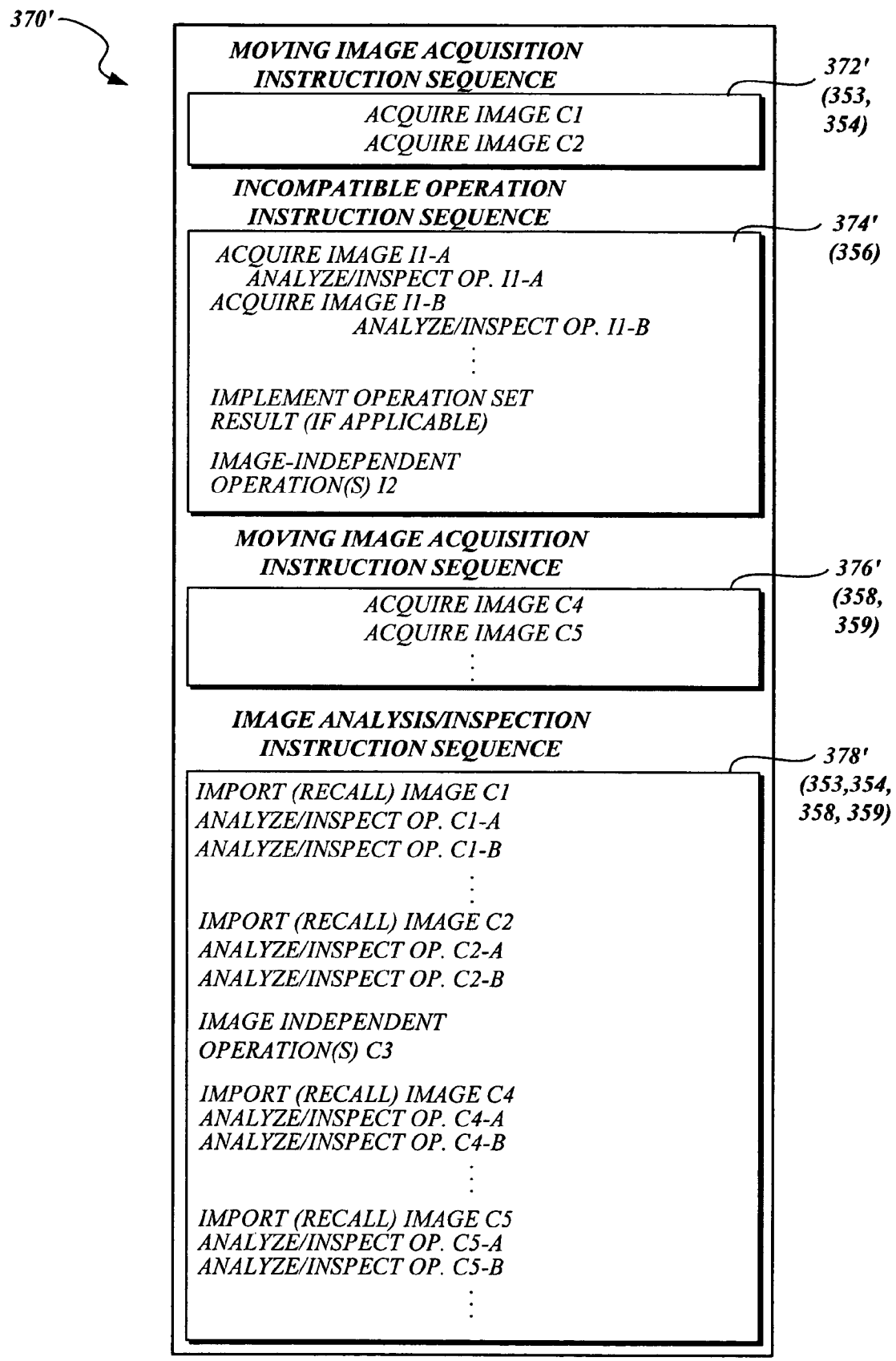
FIG. 5B illustrates a schematically represented portion of a second embodiment of a part program created according to a programming sequence that includes continuous-motion image acquisition sequences, corresponding to the typical learn mode operation sequence shown in FIG. 5A.

FIG. 5B illustrates a schematically represented portion of a second embodiment of a set of part program instructions 370' according to second exemplary method of part program instruction sequencing in accordance with this invention, for the set of learn mode image acquisition and analysis/inspection operations 350 shown in FIG. 5A. The set of part program instructions 370' has a structure very similar to that previously described for the set of part program instructions 370, with the exception that the instructions sequence 373' is structured to perform a combination of operations similar to those structured into the separated instruction sequence blocks 373 and 378 in the set of part program instructions 370 shown in FIG. 5A. Thus, only the primary differences between the set of part program instructions 370 and the set of part program instructions 370' will be described.

Initially, the instructions included in the instruction sequence 372' and the initial C1, C2, and C3 operations of the instruction sequence 373' are established as previously described with reference to the instruction sequences 372 and 373 of FIG. 5A. Next, the incompatible operation instruction sequence 374', which may be identical to the incompatible operation instruction sequence 374, has been inserted in an arrangement that terminates the previous moving image acquisition instruction sequence 372', for reasons previously described. However, in contrast to the set of part program instructions 370, in the set of part program instructions 370', the instruction sequence 373' is not terminated, but only interrupted by the incompatible operation instruction sequence 374', and then resumed following the programming of the incompatible operation instruction sequence 374', by including instructions similar to those structured into the separate instruction sequence block 378 in the set of part program instructions 370 shown in FIG. 5A. In general, this requires that additional instructions be included in the instruction sequence 373', in comparison to the instruction sequence 373, which makes the programming method associated with FIG. 5B somewhat more complicated and/or possibly less robust than that associated with FIG. 5A.

For example, for purposes of explanation, assume that the image independent operation 12 included at the incompatible block 356 of FIG. 5A alters the coordinate system that is used for subsequent operations. In the method associated with the sequence 370, the C1 and C2 operation instructions of the terminated instruction block 373 are programmed to be performed in the same coordinate system associated with the images C1 and C2, before the operations of the incompatible instruction block sequence 374, which changes the coordinate system according to this scenario, are performed. Thus, no special "coordinate system" instructions are included at the instruction sequence block 373. In contrast, in the method associated with the sequence 370', typically the C1, C2 and C3 operation instructions of the instruction block 373' must be programmed to be performed in the same coordinate system as that associated with the images C1 and C2 and the image-independent C3 operation. However, because the instructions of the block 373' are performed after the operations of the incompatible instruction block sequence 374, which changes the coordinate system according to the scenario described here, special "coordinate system" instructions that implement the coordinate system associated with the C1 and C2 images and the image-independent C3 operation while performing the associated C1-X and C2-X image analysis/inspection operations and the image-independent C3 operations that are included at the instruction sequence block 373'. For analogous reasons, in the method associated with the sequence 370', the C4 and C5 operation instructions of the "interrupted" instruction block 373' must be programmed to be performed in the same coordinate system as that associated with the images C4 and C5. However, because the C4 and C5 operation instructions of the block 373' are performed after the special "coordinate system" instructions that implement the coordinate system to be associated with the C1, C2, C3 operations of the block 373', which may change the coordinate system according to this scenario, additional special "coordinate system" instructions that implement the coordinate system associated with the C4 and C5 images while performing the associated C4-X and C5-X image analysis/inspection operations images may need to be included in the instruction sequence block 373'.

It should be appreciated that despite the additional part programming complexity, using the alternative part programming principles described above, a set part program instructions 370' has been provided wherein instructions corresponding to learn mode operations that are compatible with acquiring and analyzing/inspecting images according to a moving image acquisition sequence are arranged into the first and second moving image acquisition instruction sequences 372' and 376', and the associated subsequent image analysis/inspection instruction sequence 373', so as to continuously acquire as many images as possible using a moving image acquisition method to thereby maximize the inspection throughput.

Figure 6:
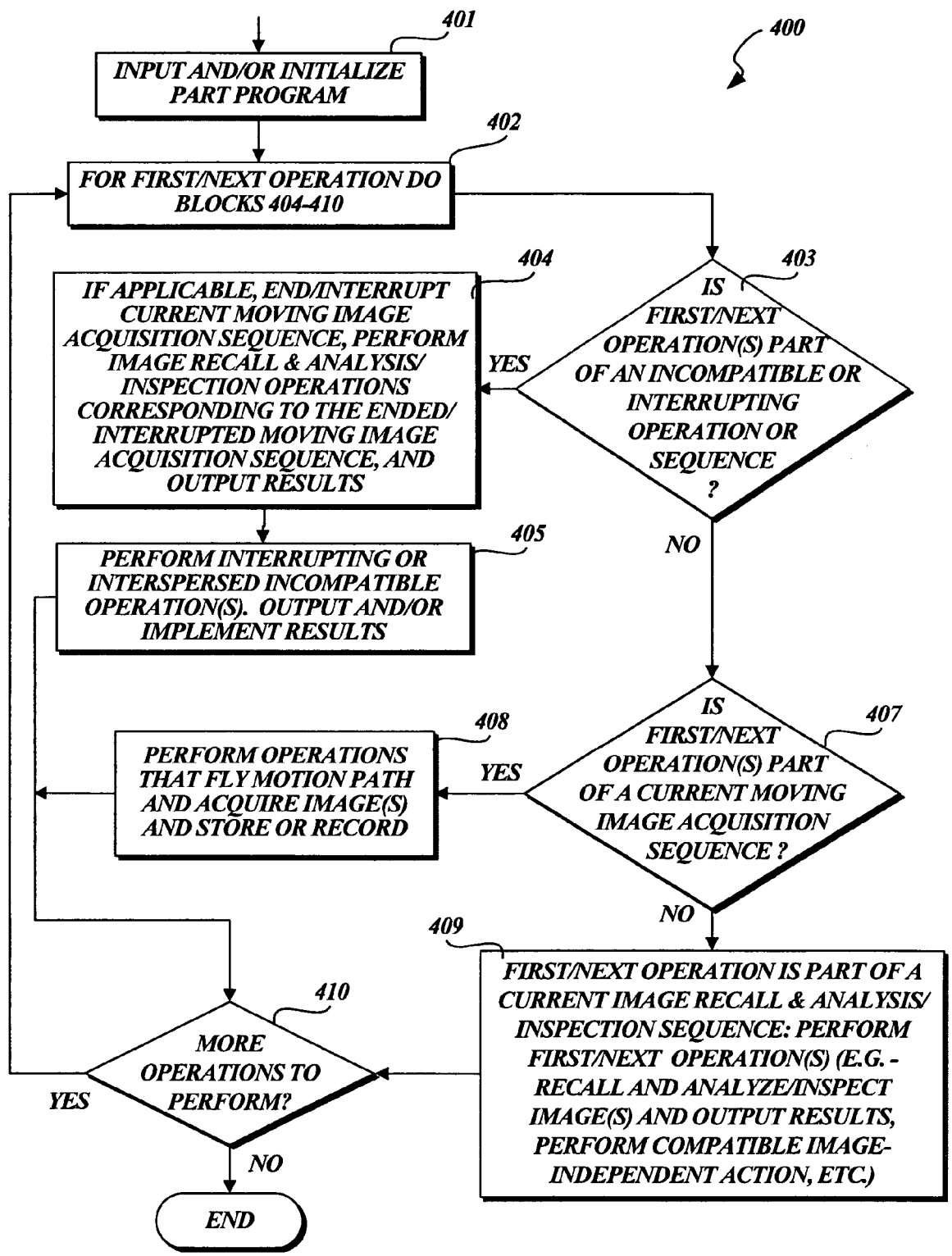
FIG. 6 is a flow diagram showing one illustrative embodiment of a part program structure for automatically performing a sequence of instructions that includes continuous-motion image acquisition sequences.

FIG. 6 is a flow diagram showing one illustrative embodiment for executing a schematically represented part program 400 for automatically performing a sequence of instructions that includes continuous-motion image acquisition sequences. At a block 401, a part program is input or initialized in a machine vision system. At a block 402, for each operation, or set of operations, defined in the part program, it is commanded that the following blocks 403-410 are to be performed.

At a decision block 403, it is determined whether the current operation or current operation set is part of an incompatible or interrupting operation or sequence, for example based on the method described with reference to FIG. 4B, or on an associated predetermined classification of the operation(s), or an identifying flag or statement in the part program, or other known method. Alternative methods for performing block 403 may be devised by one skilled in the art based on the information in this disclosure.

If an operation is determined to be part of an incompatible or interrupting operation sequence at the block 403, then operation proceeds to block 404, where if a moving image acquisition sequence was in progress, it is ended or interrupted and the images associated with the moving image acquisition sequence are recalled and their associated analysis and inspection operations are performed, and the associated results are output and/or stored. Following the completion of the operations of block 404, the incompatible or interrupting operations or sequence (determined at the block 403) is performed at the block 405.

If an operation is determined not to be part of an incompatible or interrupting operation or sequence at the block 403, then operation proceeds to decision block 407, where it is determined whether the current operation is part of a moving image acquisition sequence currently in progress. If the current operation is part of a current moving image acquisition sequence then operation proceeds to block 408, where the machine vision system is controlled to perform operations that follow or "fly" the path associated with the current moving image acquisition sequence, and acquire and store the associated images. Otherwise, if an operation is determined to not be part of a moving image acquisition sequence at block 407, then operation proceeds to block 409. In such a case, by reaching the block 409, it is assumed that the current operation is part of a current image recall and analysis inspection sequence of operations (which may also include certain independent operations, as previously described), and the current operation is performed, and the associated results are output and/or stored.

Following any of the blocks 405, 408 or 409, operation proceeds to a decision block 410 where it is determined whether there are additional part program operations to be performed. If it is determined at block 410 that there are further operations to be performed in the current part program, then operation returns to block 402 where the method continues. Otherwise, if it is determined at block 410 that there are no further operations to be performed, then the method ends.

Figure 7:
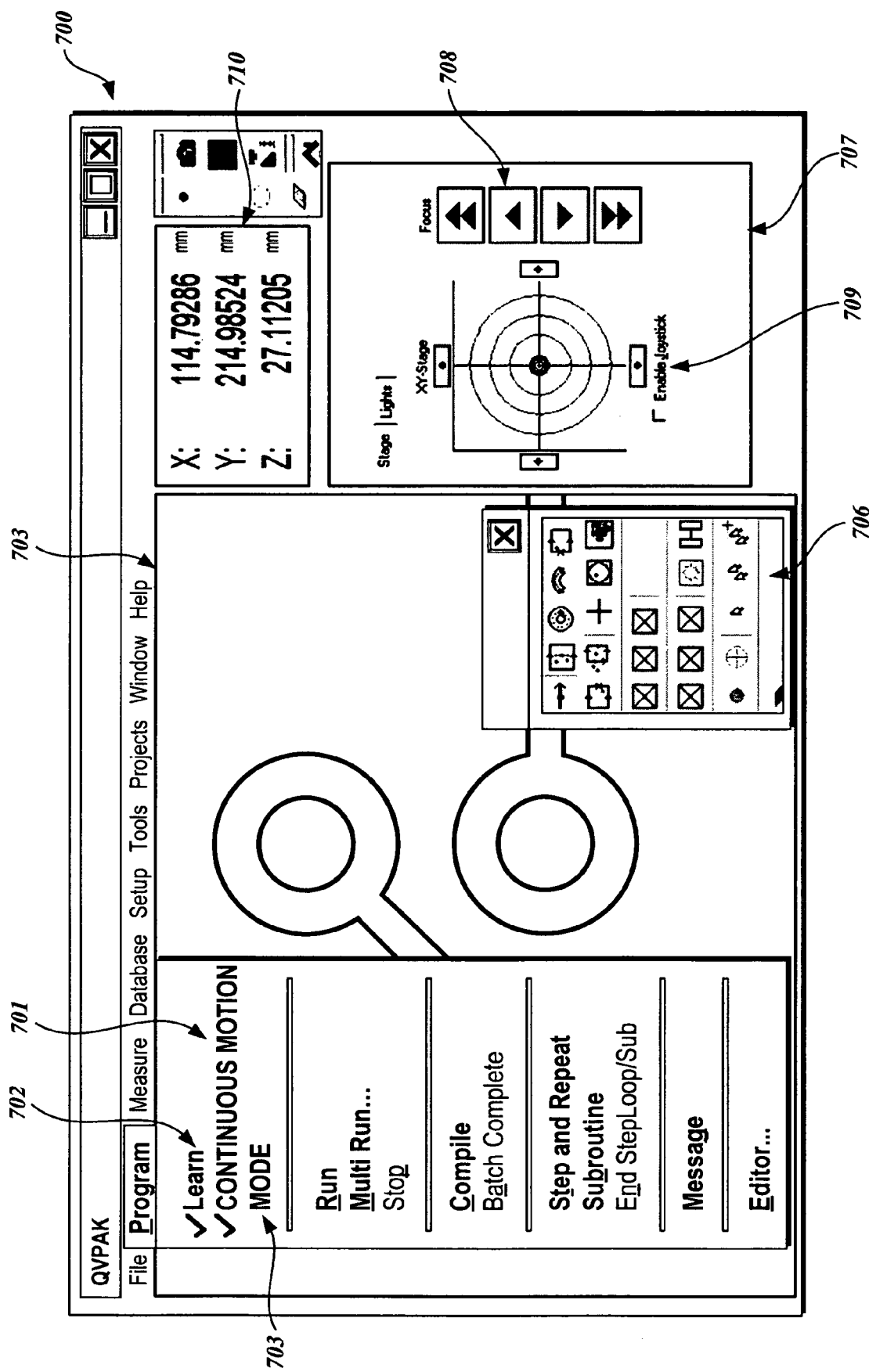
FIG. 7 is a sample screenshot from a video display that illustrates a user interface feature that allows a user to determine whether or not to implement part program creation according to the principles of this invention, in conjunction with learn mode part programming.

FIG. 7 is a sample screenshot from a video display that illustrates a user interface feature that allows a user to determine whether or not to implement part program creation according to the principles of this invention, in conjunction with learn mode part programming. In FIG. 7 a video display 700 includes a workpiece image display window 703, and a video tool panel 706, a motion control panel 707 including a Z-axis focus control portion 708 and an X-Y motion control portion 709, and an X-Y-Z position display panel 710. The video display 700 also includes a drop-down menu panel 701 that includes a "Learn" mode menu option 702, that can selected, for example by a user positioning a cursor over the menu option and clicking. When learn mode is activated or selected, this is indicated by the presence of a check mark next to the menu option. In the embodiment shown in FIG. 7, the drop-down menu panel 701 also includes a "CONTINUOUS MOTION MODE" menu option 703, that can selected or not selected, for example by a user positioning a cursor over the menu option and clicking, in order to determine whether continuous motion part programming methods or routines according to this invention will be activated during learn mode part programming operations, as previously described herein. When continuous motion part programming methods are to be activated during learn mode operations, this is indicated by the presence of a check mark next to the menu option. Thus, in the embodiment shown in FIG. 7, the systems and methods according to this invention can be activated or deactivated according to user input through the graphical user interface features described above. When continuous motion part programming methods are not activated during learn mode operations, conventional part programming results are provided during learn mode operations. In various embodiments according to this invention the user may use the same learn mode operation entry practices regardless of whether continuous motion part programming methods or conventional part programming methods are used, but the respectively resulting part programs will have a different arrangement of instructions, as previously described herein. In various other implementations, continuous motion part programming methods are activated during all learn mode operations, and the menu option 703 may be omitted.

While preferred and exemplary embodiments of the invention have been illustrated and described, it will be appreciated that various changes can be made therein according to the principles of this invention without departing from the spirit and scope of the invention.

The embodiments of the invention in which an exclusive property or privilege is claimed are define as follows:

1. A method for operating a precision machine vision inspection system for inspecting a workpiece, the precision machine vision inspection system comprising an image acquisition system comprising at least a camera; a workpiece stage; and a control system portion, wherein at least one of the workpiece stage and the camera is movable to provide relative motion with respect to each other, the method comprising;
    (a) employing a moving image acquisition mode of part programming during learn mode operations, the moving image acquisition mode of part programming providing at least one sequence of part programming instructions arranged to sequentially acquire a set of workpiece images during an uninterrupted continuous motion sequence,
    (b) for each image acquisition and analysis/inspection operation input during learn mode operation,
        (i) determining if the operation is one of compatible and incompatible with a moving image acquisition sequence of operations;
        (ii) if the operation is determined to be compatible with a moving image acquisition sequence of operations, including the corresponding image acquisition operations in a moving image acquisition sequence of instructions for acquiring and storing a set of workpiece images during continuous motion, and further determining an image analysis/inspection sequence of instructions comprising a set of respective machine control instructions for analyzing/inspecting the respective images included in the set images acquired and stored during continuous motion, wherein the respective machine control instructions for analyzing/inspecting each respective image included in the set images acquired and stored during continuous motion are executable by recalling and analyzing the respective image subsequent to the acquiring and storing the respective image such that initially acquiring and storing the set of workpiece images during continuous motion can be performed without interrupting the continuous motion; and
        (iii) if the operation is determined to be incompatible with a moving image acquisition sequence of operations, providing corresponding respective sequence of part programming instructions for performing the incompatible operation wherein the corresponding respective sequence is arranged to terminate a previously established moving image acquisition sequence of instructions, and
    (c) storing all of the determined sequences of instructions as part of a workpiece part program for the workpiece,
    wherein the performance of steps (b)(ii) and (b)(iii) based on the determination of step (b)(i) is carried out automatically without a user input.

2. The method of claim 1, wherein step (b)(i) is performed automatically without a user input.

3. The method of claim 2, wherein a set of operations are predetermined as incompatible with moving image acquisition according to their type.

4. The method of claim 3, wherein the set of operations predetermined as incompatible with moving image acquisition according to their type comprises at least one of variable motion types of operations, operations of a type whose time for completion depends on a machine vision inspection system's hardware performance characteristics, operations that requires information to be derived from immediate image analysis, and operations that involves taking plural images at the same location on the workpiece.

5. The method of claim 1, further comprising executing the workpiece program on a precision machine vision inspection system.

6. The method of claim 1, wherein when the part programming instructions are executed on a machine vision system, the execution comprises acquiring and storing a plurality of images using continuous motion, subsequently interrupting the continuous motion and performing operations that acquire an image and analyze the image to provide a result that is dependent on the image, and subsequently recalling respective images of the plurality of images acquired and stored using continuous motion and analyzing the recalled respective images based on previously defined respective analysis operations.

7. A computer-readable storage medium comprising computer executable instructions to be loaded to the control system portion of the precision machine vision inspection system for inspecting a workpiece, the computer executable instructions when executed on the control system portion perform the method of claim 1.

* * * * *

UNITED STATES PATENT AND TRADEMARK OFFICE
CERTIFICATE OF CORRECTION

PATENT NO. : 7,590,276 B2 Page 1 of 1
APPLICATION NO. : 11/018155
DATED : September 15, 2009
INVENTOR(S) : Mark L. Delaney It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1210 days.

Signed and Sealed this

Twenty-first Day of September, 2010

David J. Kappos
*Director of the United States Patent and Trademark Office*